(12) United States Patent
Liu et al.

(10) Patent No.: US 12,475,728 B2
(45) Date of Patent: Nov. 18, 2025

(54) LABEL IDENTIFICATION METHOD AND APPARATUS, DEVICE, AND MEDIUM

(71) Applicant: BEIJING YOUZHUJU NETWORK TECHNOLOGY CO., LTD., Beijing (CN)

(72) Inventors: Jinlai Liu, Beijing (CN); Bin Wen, Beijing (CN); Changhu Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 400 days.

(21) Appl. No.: 18/001,031

(22) PCT Filed: Sep. 9, 2021

(86) PCT No.: PCT/CN2021/117459
§ 371 (c)(1),
(2) Date: Dec. 7, 2022

(87) PCT Pub. No.: WO2022/078125
PCT Pub. Date: Apr. 21, 2022

(65) Prior Publication Data
US 2023/0230400 A1    Jul. 20, 2023

(30) Foreign Application Priority Data
Oct. 12, 2020  (CN) .......................... 202011086888.7

(51) Int. Cl.
*G06V 20/70*     (2022.01)
*G06F 40/30*     (2020.01)
(Continued)

(52) U.S. Cl.
CPC .............. *G06V 20/70* (2022.01); *G06F 40/30* (2020.01); *G06V 10/7715* (2022.01); *G06V 10/806* (2022.01); *G06V 20/62* (2022.01)

(58) Field of Classification Search
CPC .. G06V 20/70; G06V 10/7715; G06V 10/806; G06V 20/62; G06V 10/771;
(Continued)

(56) References Cited

U.S. PATENT DOCUMENTS 11,531,863 B1 *  12/2022  Zweig ..................... G06F 40/30
11,694,460 B1 *   7/2023  Luo ......................... G06N 3/044
                                                                382/176
(Continued)

FOREIGN PATENT DOCUMENTS

CN      110472642 A      11/2019
CN      111090763 A       5/2020
(Continued)

OTHER PUBLICATIONS

Second Office Action issued Nov. 24, 2023 in Chinese Application No. 202011086888.7, with English Translation (10 pages).
(Continued)

*Primary Examiner* — Mia M Thomas

(57) ABSTRACT

Provided are a label identification method and apparatus, a device, and a medium. The method includes: obtaining a target feature of a first image, in which the target feature characterizes a visual feature of the first image and a word feature of at least one label; and identifying a label of the first image from the at least one label based on the target feature. By characterizing the visual feature of the first image and the target feature of the word feature of the at least one label, the label of the first image is identified from the at least one label. Thus, identification accuracy of the label can be improved.

18 Claims, 3 Drawing Sheets

(51) Int. Cl.
*G06V 10/77* (2022.01)
*G06V 10/80* (2022.01)
*G06V 20/62* (2022.01)

(58) Field of Classification Search
CPC ....... G06V 10/56; G06F 40/30; G06F 40/284; G06F 40/169; G06F 16/5866
See application file for complete search history.

(56) References Cited

U.S. PATENT DOCUMENTS

| | | | |
|---|---|---|---|
| 2017/0124116 A1 | 5/2017 | League | |
| 2018/0373952 A1* | 12/2018 | Bui | G06V 30/153 |
| 2022/0117218 A1* | 4/2022 | Sibley | B23K 26/0884 |
| 2023/0222821 A1* | 7/2023 | Delp, III | G06V 10/44 |
| | | | 382/110 |
| 2023/0360421 A1* | 11/2023 | Luo | G06N 3/084 |
| 2024/0054803 A1* | 2/2024 | Negi | G06V 10/82 |
| 2024/0265547 A1* | 8/2024 | Cui | A01B 69/008 |

FOREIGN PATENT DOCUMENTS

| | | |
|---|---|---|
| CN | 111177444 A | 5/2020 |
| CN | 111507355 A | 8/2020 |
| CN | 112347290 A | 2/2021 |

OTHER PUBLICATIONS

Written Opinion for International Application No. PCT/CN2021/117459, mailed Nov. 26, 2021, 8 Pages.
Search Report mailed Nov. 26, 2021 for PCT Application No. PCT/CN2021/117459 English Translation (6 pages).
First Office Action issued May 5, 2023 in Chinese Application No. 202011086888.7, with English Translation (14 pages).

\* cited by examiner

LABEL IDENTIFICATION METHOD AND APPARATUS, DEVICE, AND MEDIUM

CROSS-REFERENCE TO RELATED APPLICATIONS

The present application claims priority to Chinese Patent Application No. 202011086888.7, entitled "LABEL IDENTIFICATION METHOD AND APPARATUS, DEVICE, AND MEDIUM" filed with the China National Intellectual Property Administration on Oct. 12, 2020, the entire content of which is incorporated herein by reference.

FIELD

The present disclosure relates to the technical field of intelligent understanding of images or video contents, and more specifically, to a label identification method and apparatus, a device, and a medium.

BACKGROUND

With the deep development of the Internet and the 4-Generation mobile communication technology (4G)/5-Generation mobile communication technology (5G), consumption of a short video and a picture presents a blowout outbreak, which further results in an indispensable for intelligent understanding of images or video contents in each link of visual contents. The most basic image intelligent-understanding task is to place an accurate and rich label on the picture.

At present, a picture label identification algorithm is to directly identify (ID) a label by identifying all labels from zero. That is, a label identification task of the picture is converted into a learning task of a mapping relationship between training data corresponding to the label and classification identification corresponding to the label. Although identifying label may achieve the image intelligent-understanding task, the label is not rich enough, and accuracy of the label identification is not high enough.

SUMMARY

A label identification method and apparatus, a device, and a medium are provided, which can not only diversify a label, but also improve accuracy of label identification.

In a first aspect, a label identification method is provided. The label identification method includes: obtaining a target feature of a first image, in which the target feature characterizes a visual feature of the first image and a word feature of at least one label; and identifying a label of the first image from the at least one label based on the target feature.

In a second aspect, a label identification apparatus is provided. The label identification apparatus includes: an obtaining module configured to obtain a target feature of a first image, in which the target feature characterizes a visual feature of the first image and a word feature of at least one label; and an identification module configured to identify a label of the first image from the at least one label based on the target feature.

In a third aspect, an electronic device is provided. The electronic device includes a memory having a computer program stored thereon, and a processor configured to call and execute the computer program stored in the memory to implement the method in the first aspect.

In a fourth aspect, a computer-readable medium is provided. The computer-readable medium has a computer program stored thereon. The computer program causes a computer to implement the method in the first aspect.

With the target feature characterizing the visual feature of the first image and the word feature of the at least one label, the label of the first image is identified from the at least one label. Thus, the label of the first image can be identified based on the visual feature of the first image. Further, the label of the first image has semantics or meaning based on semantics of the at least one label and the relationship between the labels of the at least one label during the identifying of the label of the first image. Thus, identification accuracy of the label can be improved.

That is, by explicitly considering the semantic relationship between the labels, and in combination with the visual feature of the first image, at least one label having an association relationship with the first image can be identified, which improves identification effect of the label.

In particular, there may be a ten-thousand-level number of labels in a large-scale multi-label classification network, and label types or partition granularity can be enriched by explicitly considering the semantic relationships between the labels, which facilitates the design of the label having semantic diversity.

In summary, the label of the first image is identified by the target feature, which can not only diversify the label, but also improve the accuracy of label identification.

DETAILED DESCRIPTION

Technical solutions according to embodiments of the present disclosure will be described below in combination with accompanying drawings.

It should be noted that a label identification scheme according to the present disclosure may be applied in any scene that needs intelligent understanding for a picture or video content, for example, scenes like picture and video search, recommendation, and audit, and for another example, a scene of object-viewing and image-recognizing.

For example, for an image search scene, a retrieval service of graphic image data related to an image on the Internet may be provided for a user by searching for a visual feature of the image. For another example, for the scene of the object-viewing and image-recognizing, the image is transmitted to a trained electronic device, and the electronic device may identify a label corresponding to the image by extracting visual information of the image. For example, when the image is an image of a plant, the electronic device may identify that a label of the image is a plant or a specific name of the plant.

Figure 1:
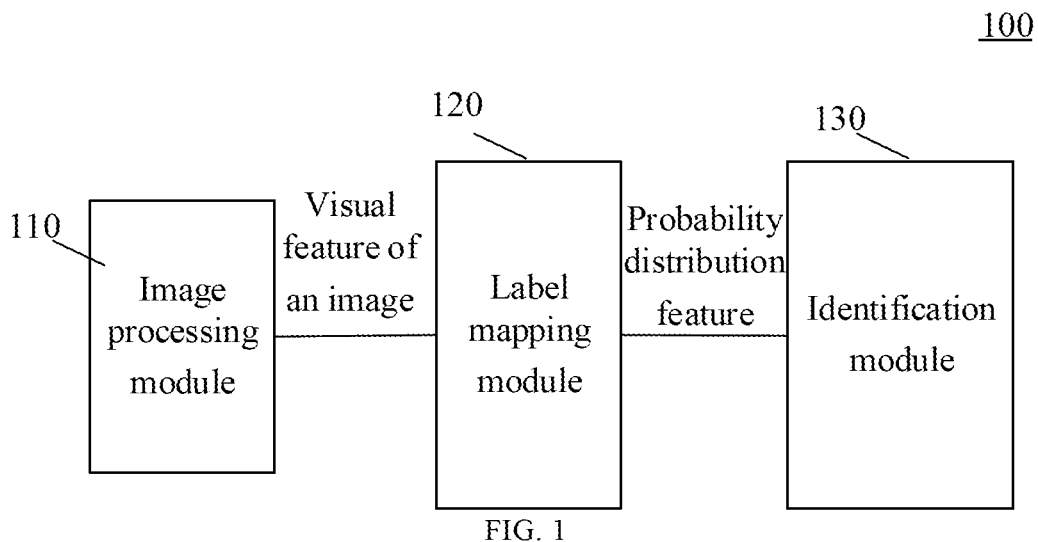
FIG. 1 is an example of a system framework according to the present disclosure.

FIG. 1 is an example of a system framework 100 according to the present disclosure.

As illustrated in FIG. 1, the system framework 100 may include an image processing module 110, a label mapping module 120, and a label identification module 140.

Here, the image processing module 110 may be configured to extract a visual feature of an image, and transmit the extracted visual feature to the label mapping module 120. The label mapping module 120 is configured to map the received visual feature of the image to a probability distribution feature. The probability distribution feature may be a distribution having a length or a number of dimensions of N. Each bit or numerical value in the probability distribution feature corresponds to one label, and a label corresponding to a maximum numerical value in the probability distribution feature may be determined as a label of the image. That is, the label corresponding to the maximum numerical value in the probability distribution feature may be marked for the image.

In some embodiments of the present disclosure, the image processing module 110 may be any module having an image feature extraction or abstraction function. For example, the image processing module 110 may be an image model such as a residual network (resnet).

It should be understood that FIG. 1 is merely an example of the present disclosure, and should not be understood as limitation to the present disclosure.

For example, the system framework 100 may further include an image obtaining module configured to obtain an image and input the obtained image to the image processing module 110.

In the above system framework 100, the image processing module 110 can directly output the extracted visual feature of the image to the label mapping module 120, to enable the label mapping module 120 to map the received visual feature of the image to the probability distribution feature.

That is, the label of the image may be identified only based on the visual feature of the image.

One contribution of the embodiments of the present disclosure is that an important factor that affects identification accuracy in a label identification process is found or recognized, i.e., semantics or meaning of the label is not explicitly considered. Since there may be a predetermined semantic relationship between the labels, rather than the labels being independent of each other, in a label identification process, semantic or meaning of the at least one label is explicitly considered, which not only enables the label to be diversified, but also improves accuracy of label identification.

For example, there are different semantic relationships such as generic-specific, similarity, or opposite relationship, between the labels. For example, there is a generic-specific relationship between a label "dog" and a label "huskie". For another example, there is a similar semantic relationship between a label "African elephant" and a label "Asian elephant". For another example, there is an opposite semantic relationship between a label "day" and a label "night".

A label identification method according to embodiments of the present disclosure will be described below with reference to FIG. 2 and FIG. 5.

Figure 2:
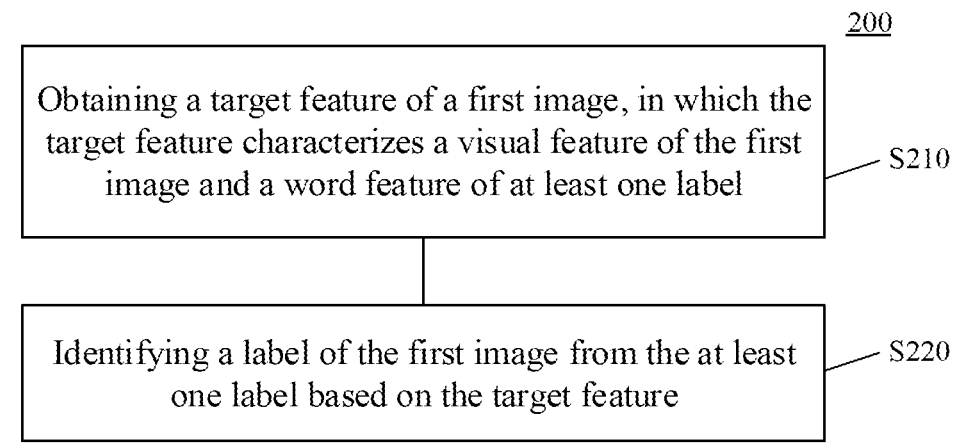
FIG. 2 is a schematic flowchart of a label identification method according to an embodiment of the present disclosure.

FIG. 2 is a schematic flowchart of a label identification method 200 according to an embodiment of the present disclosure.

As illustrated in FIG. 2, the method 200 may include actions at blocks S210 and S220.

At block S210, a target feature of a first image is obtained. The target feature characterizes a visual feature of the first image and a word feature of at least one label.

At block S220, a label of the first image is identified from the at least one label based on the target feature.

For example, the target feature is generated based on the visual feature of the first image and the word feature of the at least one label, to identify the label of the first image from the at least one label based on the target feature.

With the target feature characterizing the visual feature of the first image and the word feature of the at least one label, the label of the first image is identified from the at least one label. Thus, the label of the first image can be identified based on the visual feature of the first image. Further, the label of the first image has semantics or meaning based on semantics of the at least one label and the relationship between the labels of the at least one label during the identifying of the label of the first image. Thus, identification accuracy of the label can be improved.

That is, by explicitly considering a semantic relationship between the labels, and in combination with the visual feature of the first image, at least one label associated with the first image can be identified, which improves identification effect of the label.

In some embodiments, there may be a ten-thousand-level number of labels in a large-scale multi-label classification network, and label types or partition granularity may be enriched by explicitly considering the semantic relationships between the labels, which facilitates a design of the label of semantic diversity.

In summary, through identifying the label of the first image by the target feature, it is possible not only to diversify the label, but also to improve the accuracy of the label identification.

It should be noted that obtaining manners for the visual feature of the first image and for the word feature of the at least one label are not specifically limited in present disclosure.

For example, the visual feature of the first image may be obtained by the image model such as the resnet.

For another example, the word feature of the at least one label may be obtained by a one-hot encoder or word vector (wordvec) model. The one-hot encoder may be referred to as one-bit effective encoder. For example, N states may be encoded by using a N-bit state register, and each state has its independent register bit, and in which only one bit is valid at any time. The wordvec model may be used to generate a relevant model of a word vector, such as a shallow double-layer neural network, which may be used to train to rebuild word text of linguistic.

In addition, the visual feature may be referred to as a visual modal feature, a visual representation, or a visual expression. The word feature may also be referred to as a text modal feature, a word representation, or a word expression.

In some embodiments of the present disclosure, at least one visual feature vector corresponding to at least one image channel of the first image is used to generate the visual feature of the first image. At least one word feature vector corresponding to the at least one label is used to generate the word feature of the at least one label.

That is, the visual feature of the first image may be a feature obtained by processing a feature vector of the image channel of the first image. The word feature of the at least one label may be a feature obtained by processing a word feature vector of the at least one label.

For example, the first image is a Red Green Blue (RGB) color image. The at least one image channel may include three color channels including a red (R) channel, a green (G) channel, and a blue (B) channel. The at least one visual feature vector may include three visual feature vectors respectively corresponding to the red (R) channel, the green (G) channel, and the blue (B) channel.

In some embodiments of the present disclosure, the at least one word feature vector is used to direct the at least one visual feature vector to generate the visual feature of the first image. The at least one visual feature vector is used to direct the at least one word feature vector to generate the word feature of the at least one label.

In a process of generating the visual feature of the first image and the word feature of the at least one label, by not only considering a relationship between the word feature vectors and a relationship between the visual feature vectors, but also considering a relationship between the word feature vector and the visual feature vector, the target feature is obtained through multi-layer intersection and fusion, which can improve the target feature.

It should be understood that specific forms of the first image, the visual feature vector, and the word feature vector are not limited in the present disclosure. For example, the visual feature vector may be a vector of a specific number of dimensions, for example, a 128-dimensional vector. For another example, the first image may be an image having a three-dimensional tensor, to facilitate extracting the visual feature of the first image based on the three-dimensional tensor of the first image.

In some embodiments of the present disclosure, a number of the image channels in the at least one image channel is equal to a number of the labels in the at least one label.

By setting the number of the image channels in the at least one image channel equal to the number of the labels in the at least one label, it is possible for a number of the visual features in the at least one visual feature to be equal to the number of the labels in the at least one label, which facilitates merging the at least one visual feature and the at least one label to the target feature, and thus complexity of processing data is reduced.

In some embodiments of the present disclosure, a number of dimensions of each of the at least one visual feature vector is equal to a number of dimensions of each of the at least one word feature vector.

By setting the number of dimensions of each of the at least one visual feature vector equal to the number of dimensions of each of the at least one word feature vector, it is possible for a length of each visual feature to be equal to a length of each word vector feature, which facilitates merging the at least one visual feature and the at least one label to the target feature, and thus the complexity of processing the data is reduced.

In some embodiments of the present disclosure, the operation at block S210 may include: determining a first matrix based on the at least one visual feature vector; determining a second matrix based on the at least one word feature vector; and determining the target feature based on the first matrix and the second matrix.

For example, a product of the first matrix and the second matrix may be determined as the target feature. For another example, the first matrix and the second matrix may also be spliced together to generate the target feature.

For another example, each of the at least one visual feature vector may be used as a row vector of the first matrix, and each of the at least one word feature vector may be used as the row vector of the first matrix. For another example, each of the at least one visual feature vector may be used as a column vector of the first matrix, and each of the at least one word feature vector may be used as the column vector of the first matrix.

A description will be provided below by taking a case in which each of the at least one visual feature vector is used as the row vector of the first matrix and each of the at least one word feature vector is used as the row vector of the first matrix for example as an example. When the number of the image channels in the at least one image channel is equal to the number of the labels in the at least one label, a product of the second matrix and a transposed matrix of the first matrix may be determined as the target feature. When the number of dimensions of each of the at least one visual feature vector is equal to the number of dimensions of each of the at least one word feature vector, a product of the first matrix and a transposed matrix of the second matrix may be determined as the target feature.

In some embodiments of the present disclosure, the first matrix is a product of a matrix defined by the at least one visual feature vector and a first weight. The second matrix is a product of a matrix defined by at least one word vector and a second weight. The first weight is a weight determined based on a score of the at least one word feature vector. The second weight is a weight determined based on a score of the at least one visual feature vector.

That is, a matrix defined by the at least one visual feature vector may be directed or adjusted by the first weight determined by the score of the at least one word feature vector, or a matrix defined by the at least one word feature vector may also be directed or adjusted by the second weight determined by the score of the at least one visual feature vector. That is, the at least one visual feature vector and the at least one word feature vector are initially fused before a product operation is performed on the first matrix and the second matrix, to improve a fusion degree of the visual feature of the first image and the word feature of the at least one label, and correspondingly improve the identification accuracy.

For example, the first matrix or the second matrix may be determined based on the following equation:

$$\text{Attention }(Q, K, V) = \text{soft max}\left(\frac{QK^T}{\sqrt{d_k}}\right)V \quad (1)$$

where Q, V, and K are triple vectors of an attention mechanism, and $d_k$ represent a number of dimensions of K in the triple vector.

Taking the at least one word feature vector as an example, assuming that each word feature vector of the at least one word feature vector has 512 dimensions, the at least one word feature vector may be represented as a matrix, i.e., a third matrix. The third matrix may be mapped to a low-dimensional vector space such as a space of 64 dimensions through three parameter matrices QM, KM, and VM, to obtain a representation of the third matrix in three low-dimensional vector spaces, i.e., Q, K, V of the third matrix. For example, the third matrix may be multiplied by QM, KM, and VM, respectively, to obtain the Q, K, V of the third matrix.

A matrix A obtained by performing matrix multiplication on the Q of the third matrix and the K of the third matrix may be used as the score of the at least one word feature vector.

The score of the at least one word feature vector may be used to interpret a matching degree between each label in the at least one label and labels at other positions. Through scaling the matrix A, for example, dividing each element by a number of dimensions of a K vector under the root number, it is possible to prevent a result of an inner product from being too large to enter a region with a gradient of 0 during the training.

Briefly, the matrix multiplication is performed on the Q of the third matrix and the K of the third matrix, and then the result is normalized to obtain the first weight. The first weight is used to assign V of a fourth matrix defined by the at least one visual feature vector.

It should be noted that a "Multi-Head" Attention may be employed to obtain the Q. K and V of the third matrix or the fourth matrix. "Multi-Head" may refer to using multiple sets of initialization values when a parameter matrix QM, KM, VM are initialized. For example, taking the at least one word feature vector as an example, a representation relationship of different semantics between the labels of the at least one label may be learned through the multiple sets of initialization values. For example, a set of matrices may be used to explain an emotion connection of the at least one label, and another set of matrices may be used to interpret mapping of finer granularity for a named entity. Therefore, a plurality of first matrices with different weights may be obtained. In some embodiments, the plurality of first matrices may be fused into one matrix through a fusion matrix W.

Figure 3:
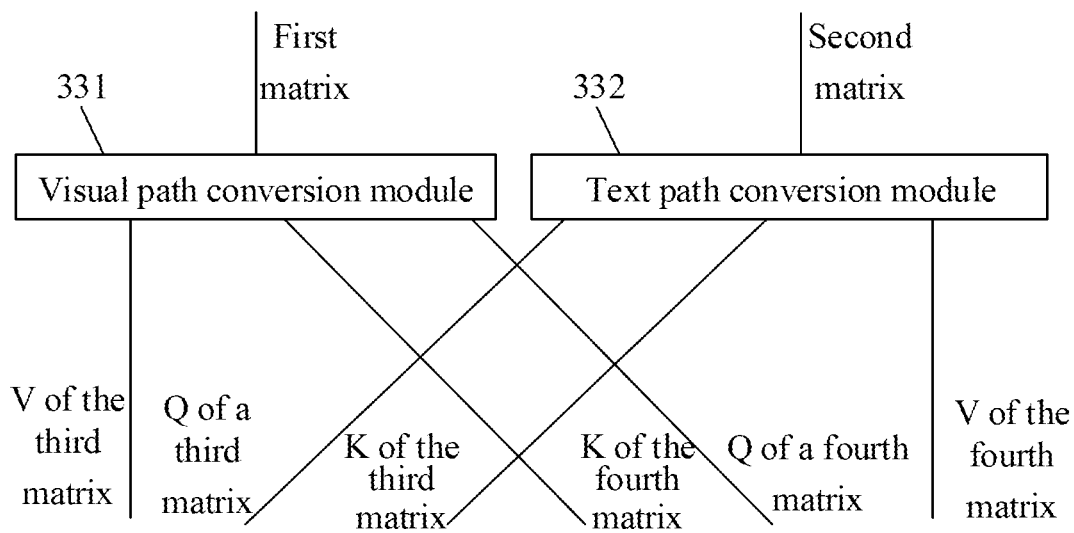
FIG. 3 is a schematic block diagram of obtaining a first matrix and a second matrix according to an embodiment of the present disclosure.

FIG. 3 is a schematic block diagram of obtaining the first matrix and the second matrix according to an embodiment of the present disclosure.

As illustrated in FIG. 3, a visual path conversion module 331 is configured to generate the visual feature of the first image. A text path conversion module 332 is configured to generate the word feature of the at least one label.

For example, the text path conversion module 332 receives the Q and K of the third matrix, and directs or supervises the V of the fourth matrix based on the Q and K of the third matrix, to output the second matrix. The visual feature processing module 331 receives the Q and K of the fourth matrix, and directs or supervises the V of the third matrix based on the Q and K of the fourth matrix, to output the first matrix. Based on this, the target feature may be determined based on the first matrix and the second matrix.

In some embodiments of the present disclosure, the operation at block S220 may include: mapping the target feature to a probability distribution feature, in which a number of dimensions of the probability distribution feature is equal to a number of dimensions of the at least one label, and a value at a position in the probability distribution feature represents a confidence of a label corresponding to the value at the position: determining a first numerical value greater than a predetermined threshold in the probability distribution feature; and determining a label corresponding to the first numerical value as the label of the first image.

For example, the target feature may be a product matrix, i.e., the product of the first matrix and the second matrix. On this basis, the product matrix may be mapped to the probability distribution feature, to determine the label of the first image based on the probability distribution feature.

It should be noted that the predetermined threshold may be a numerical value range, or may be a specific numerical value. Of course, thresholds corresponding to the labels of the at least one label may be partially or completely different from each other. For example, a predetermined threshold corresponding to a generic label may be greater than or equal to a predetermined threshold corresponding to a specific label. For example, a predetermined threshold corresponding to the label "dog" is 8 or 9, and a predetermined threshold corresponding to the label "huskie" is 5 or 6. Of course, the above specific numerical values are merely examples, and the present disclosure is not limited thereto. In addition, the confidence may also be referred to as a reliability degree, a confidence level, or a confidence coefficient. The number of dimensions of the probability distribution feature may also be referred to as a confidence interval. The numerical value in the probability distribution feature may represent estimation accuracy at which a label corresponding to the numerical value is estimated as the label of the first image.

In some embodiments of the present disclosure, there is a semantic relationship between the labels of the at least one label.

In some embodiments of the present disclosure, the semantic relationship includes at least one of a generic-specific semantic relationship, a similar semantic relationship, or an opposite semantic relationship.

For example, different semantic relationships such as a generic-specific, similarity, or opposite relationship may apply between the labels. For example, there is the generic-specific relationship between the label "dog" and the label "huskie". For another example, there is the similar semantic relationship between the label "African elephant" and the label "Asian elephant". For another example, there is the opposite semantic relationship between the label "day" and the label "night".

In some embodiments of the present disclosure, the label of the first image includes the at least one label.

For example, the label of the first image may include labels, between which there is the generic-specific semantic relationship. For example, the labels of the first image may include the label "dog" and the label "huskie".

In some embodiments of the present disclosure, the operation at block A210 may include: obtaining the target feature using a prediction model with the visual feature of the first image as an input.

For example, the at least one label may be a label in the prediction model. In this case, after the visual feature of the first image is input into the prediction model, the prediction model may obtain the target feature based on the visual feature of the first image and the word feature of the at least one label.

In some embodiments of the present disclosure, the method 200 may further include: training the prediction model by a plurality of images and labels of the plurality of images.

For example, the prediction model may be trained by a visual feature of each of the plurality of images and a word feature of a label of the same image.

Figure 4:
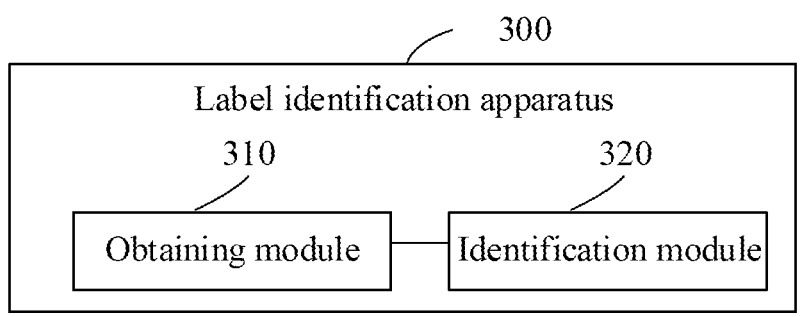
FIG. 4 is a schematic block diagram of a label identification apparatus according to an embodiment of the present disclosure.

FIG. 4 is a schematic block diagram of a label identification apparatus 300 according to an embodiment of the present disclosure.

As illustrated in FIG. 4, the apparatus 300 includes: an obtaining module 310 configured to obtain a target feature of a first image, in which the target feature characterizes a visual feature of the first image and a word feature of at least one label; and an identification module 320 configured to identify a label of the first image from the at least one label based on the target feature.

In some embodiments of the present disclosure, at least one visual feature vector corresponding to at least one image channel of the first image is used to generate the visual feature of the first image. At least one word feature vector corresponding to the at least one label is used to generate the word feature of the at least one label.

In some embodiments of the present disclosure, the at least one word feature vector is used to direct the at least one visual feature vector to generate the visual feature of the first image. The at least one visual feature vector is used to direct the at least one word feature vector to generate the word feature of the at least one label.

In some embodiments of the present disclosure, a number of the image channels in the at least one image channel is equal to a number of the labels in the at least one label.

In some embodiments of the present disclosure, a number of dimensions of each of the at least one visual feature vector is equal to a number of dimensions of each of the at least one word feature vector.

In some embodiments of the present disclosure, the obtaining module 310 is further configured to: determine a first matrix based on the at least one visual feature vector; determine a second matrix based on the at least one word feature vector; and determine the target feature based on the first matrix and the second matrix.

In some embodiments of the present disclosure, the first matrix is a product of a matrix defined by the at least one visual feature vector and a first weight. The second matrix is a product of a matrix defined by at least one word vector and a second weight. The first weight is a weight determined based on a score of the at least one word feature vector. The second weight is a weight determined based on a score of the at least one visual feature vector.

In some embodiments of the present disclosure, the identification module 320 is further configured to map the target feature to a probability distribution feature, in which a number of dimensions of the probability distribution feature is equal to a number of dimensions of the at least one label, and a value at a position in the probability distribution feature represents a confidence of a label corresponding to the value at the position; determine a first numerical value greater than a predetermined threshold in the probability distribution feature; and determine a label corresponding to the first numerical value as the label of the first image.

In some embodiments of the present disclosure, there is a semantic relationship between the labels of the at least one label.

In some embodiments of the present disclosure, the semantic relationship includes at least one of a generic-specific semantic relationship, a similar semantic relationship, or an opposite semantic relationship.

In some embodiments of the present disclosure, the label of the first image includes the at least one label.

In some embodiments of the present disclosure, the operation of obtaining the target feature of the first image includes: obtaining the target feature using a prediction model with the visual feature of the first image as an input.

It should be understood that the apparatus embodiments may correspond to the method embodiments, and reference may be made to the method embodiments for similar description of the apparatus embodiments, and thus details thereof will be omitted herein for clarity. Specifically, the apparatus 300 shown in FIG. 4 may correspond to a corresponding object that performs the method 200 according to the embodiments of the present disclosure, and the above and other operations and/or functions of modules in the apparatus 300 are used to perform corresponding operations in the steps in FIG. 2, respectively, and thus details thereof will be omitted here for simplicity.

Figure 5:
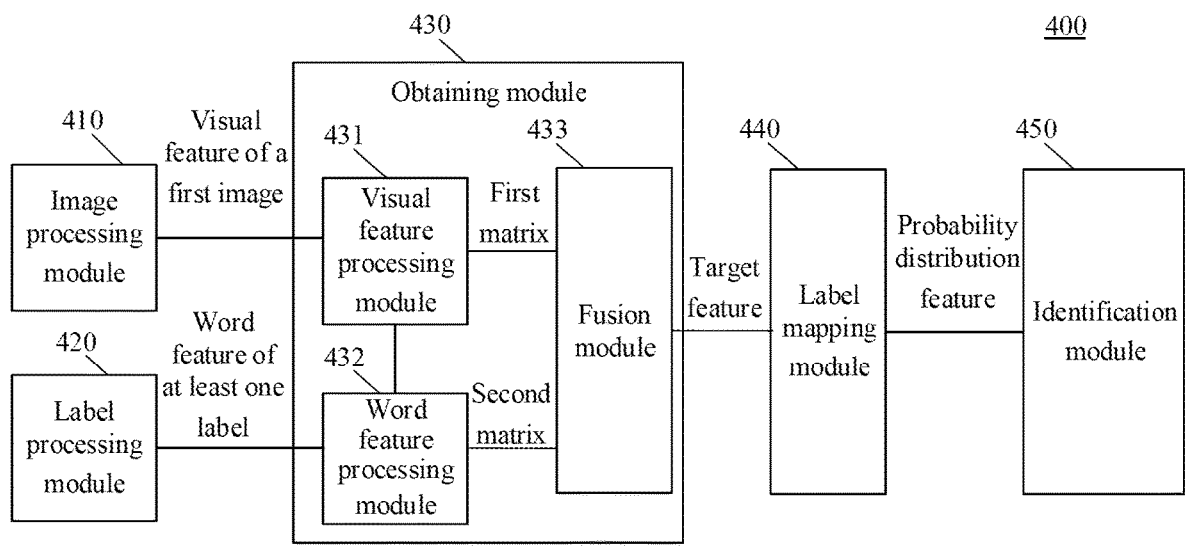
FIG. 5 is a schematic block diagram of a label identification system according to an embodiment of the present disclosure.

FIG. 5 is a schematic block diagram of a label identification system 400 according to an embodiment of the present disclosure.

As illustrated in FIG. 5, the system 400 may include an image processing module 410, a label processing module 420, an obtaining module 430, a label mapping module 440, and an identification module 450. In some embodiments, the label mapping module 430 may have the same function as the label mapping module 120 shown in FIG. 1. In some embodiments, the identification module 450 may have the same function as the identification module 140 shown in FIG. 1 or the identification module 320 shown in FIG. 4.

As illustrated in FIG. 5, the obtaining module 430 may include a visual feature processing module 431, a word feature processing module 432, and a fusion module 433.

Here, the image processing module 410 is configured to extract or abstract a visual feature of a first image, and input the extracted or abstracted visual feature of the first image into the visual feature processing module 431 of the obtaining module 430. The label processing module 420 is configured to extract or abstract a word feature of at least one label, and input the word feature of the at least one label into the word feature processing module 432 of the obtaining module 430. The visual processing module 431 is configured to generate a first matrix based on the received visual feature of the first image, and input the first matrix into the fusion module 433. The word feature processing module 432 is configured to generate a second matrix based on the received word feature of the at least one label, and input the second matrix into the fusion module 433. The fusion module 433 is configured to obtain a target feature based on the first matrix and the second matrix. The label mapping module 440 is configured to: subsequent to the target feature transmitted by the fusion module 433 being received by the label mapping module 440, generate a probability distribution feature based on the target feature, and transmit the probability distribution feature to the identification module 450 to enable the identification module 450 to identify the label of the first image.

It should be understood that FIG. 5 is merely an example of the present disclosure, and should not be understood as limitation for the present disclosure.

For example, the functions of the visual feature processing module 431 and the word feature processing module 432 may refer to the functions of the visual path conversion module 331 and the text path conversion module 332, respectively.

For another example, both the visual feature processing module 431 and the word feature processing module 432 may include a transformer model.

For example, the transformer model may include an encoder portion and a decoder portion. The encoder portion and the decoder portion each have a same six-layer structure. An output of the encoder portion serves as an input of the decoder portion. For example, each layer structure in the encoder portion may include an input embedding module, a positional encoding module, a multi-head attention module, and a feed forward neural network of an Add&Norm. For another example, each layer structure in the decoder portion may include the output embedding module, the position encoding module, a masked multi-head attention module, the multi-head attention module, the feed forward neural network of the Add&Norm, a linear processing module, and a softmax module.

The apparatus and system according to the embodiments of the present disclosure are described above in the functional modules in conjunction with the accompanying drawings. It should be understood that the functional modules can be implemented in a form of hardware, instructions in a form of software, or a combination of hardware and software modules. Specifically, steps of the method embodiments in the embodiments of the present disclosure can be completed by hardware integrated logic circuits in a processor and/or instructions in the form of software. The septs of the method disclosed in conjunction with the embodiments of the present disclosure can be directly embodied as being executed by a hardware decoding processor, or executed by a combination of hardware and software modules in the decoding processor. In some embodiments, the software module may be located in a mature storage medium in the art such as a random access memory, a flash memory, a read-only memory, a programmable read-only memory, an electrically erasable programmable memory, a register. The storage medium is located in the memory, and the processor can read information from the memory, and complete the steps in the above method embodiments in combination with the hardware in the processor.

Figure 6:
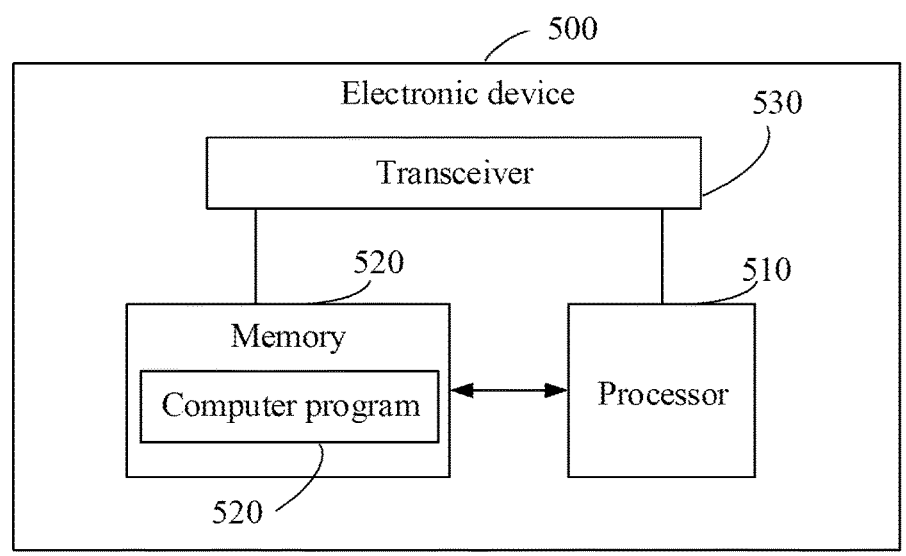
FIG. 6 is a schematic block diagram of an electronic device according to an embodiment of the present disclosure.

FIG. 6 is a schematic block diagram of an electronic device 500 according to an embodiment of the present disclosure.

As illustrated in FIG. 6, the electronic device 500 may include a memory 510 and a processor 520. The memory 510 is configured to store a computer program 511 therein, and transmit codes of the program to the processor 520. That is, the processor 520 can call the computer program 511 from the memory 510 and execute the computer program 511 to implement the method according to the embodiments of the present disclosure.

For example, the processor 520 may be configured to execute steps in the method 200 described above based on instructions in the computer program 511.

In some embodiments of the present disclosure, the processor 520 may include but is not limited to a general-purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, etc.

In some embodiments of the present disclosure, the memory 510 includes but is not limited to a volatile memory and/or a non-volatile memory. Here, the non-volatile memory may be a read-only memory (ROM), a Programmable ROM (PROM), an Erasable PROM (EPROM), an Electrically EPROM (EEPROM), or a flash memory. The volatile memory may be a Random Access Memory (RAM) used as an external high-speed cache. By exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM), and a Direct Rambus RAM (DR RAM).

In some embodiments of the present disclosure, the computer program 511 may be divided into one or more modules that are stored in the memory 510 and executable by the processor 520 to implement a page recording method according to the present disclosure. The one or more modules may be a series of instruction segments of the computer program that are capable of implementing specific functions, and the instruction segments are used to describe an execution process of the computer program 511 in the electronic device 500.

As illustrated in FIG. 6, the electronic device 500 may further include a transceiver 540 connected to the processor 520 or the memory 510.

Here, the processor 520 may control the transceiver 540 to communicate with other devices. In a further embodiment, the processor 520 control the transceiver 540 to transmit information or data to other devices, or receive information or data transmitted by other devices. The transceiver 540 may include a transmitter and a receiver. The transceiver 540 may further include one or more antennas.

It should be understood that various components in the electronic device 500 are connected to each other by a bus system. Here, in addition to a data bus, the bus system further includes a power bus, a control bus, and a status signal bus.

The present disclosure further provides a computer storage medium. The computer storage medium has a computer program stored thereon. The computer program, when executed by a computer, causes the computer to perform the method according to the above embodiments. In other words, embodiments of the present disclosure further provide a computer program product including instructions. The instructions, when executed by a computer, cause the computer to perform the method according to the above embodiments.

When implemented by software, the implementation may be made in the form of a computer program product completely or partially. The computer program product includes one or more computer instructions. The computer program instructions, when loaded and executed on a computer, generate all or a part of the processes or functions described in the embodiments of the present disclosure. The computer may be a general-purpose computer, an application specific computer, a computer network, or any other programmable devices. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (such as a coaxial cable, an optical fiber, a Digital Subscriber Line (DSL)) or a wireless manner (such as infrared, wireless, microwave). The computer-readable storage medium may be any available medium that can be accessed by a computer or a data storage device such as a server or a data center integrated with one or more available medium. The available medium may be a magnetic medium (for example, a floppy disk, a hard disk, a magnetic tape), an optical medium (for example, a Digital Video Disc (DVD)), a semiconductor medium (for example, a Solid State Disk (SSD)), etc.

It will be appreciated by those of ordinary skill in the art that the modules and the algorithm steps of the examples described in combination with the embodiments disclosed herein may be implemented in electronic hardware or a combination of computer software and electronic hardware, which may depend on specific applications and design constraint conditions of the technical solution. For each specific application, professionals and technicians may use different methods to implement the described functions, and such implementation should not be considered as exceeding the scope of the present disclosure.

In several embodiments according to the present disclosure, it should be understood that, the disclosed device, apparatus, and method can be implemented in other ways. For example, the apparatus embodiments described above are merely exemplary. For example, the modules are merely divided based on logic functions. In practical implementation, the modules can be divided in other manners. For example, multiple modules or components may be combined or integrated into another system, or some features may be omitted or not performed. In addition, the illustrated or discussed mutual or direct coupling or communication connection may be implemented as indirect coupling or communication connection via some interfaces, devices or modules, and may be electrical, mechanical, or in other forms.

The modules illustrated as separate components may be or not be separated physically, and components shown as modules may be or not be physical modules, i.e., may be located at one position, or distributed onto multiple network units. It is possible to select some or all of the modules as desired to achieve the objective of the embodiments of the present disclosure. For example, respective functional modules in respective embodiments of the present disclosure may be integrated into one processing module, or may be present as separate physical entities. It is also possible to integrate two or more modules into one module.

The above description merely illustrates specific implementations of the present disclosure, and the scope of the present disclosure is not limited thereto. Any change or replacement within the scope claimed by the present disclosure can be easily conceived by those skilled in the art, and should fall within the scope of the present disclosure. Thus, the scope of the present disclosure is defined only by the claims.

What is claimed is:

1. A label identification method, comprising:
obtaining a target feature of a first image, wherein the target feature characterizes a visual feature of the first image and a word feature of at least one label; and
identifying a label of the first image from the at least one label based on the target feature; wherein:
at least one visual feature vector corresponding to at least one image channel of the first image is used to generate the visual feature of the first image; and
at least one word feature vector corresponding to the at least one label is used to generate the word feature of the at least one label.

2. The method according to claim 1, wherein:
the at least one word feature vector is used to direct the at least one visual feature vector to generate the visual feature of the first image; and
the at least one visual feature vector is used to direct the at least one word feature vector to generate the word feature of the at least one label.

3. The method according to claim 1, wherein a number of image channels in the at least one image channel is equal to a number of labels in the at least one label.

4. The method according to claim 1, wherein a number of dimensions of each of the at least one visual feature vector is equal to a number of dimensions of each of the at least one word feature vector.

5. The method according to claim 1, wherein said obtaining the target feature of the first image comprises:
determining a first matrix based on the at least one visual feature vector;
determining a second matrix based on the at least one word feature vector; and
determining the target feature based on the first matrix and the second matrix.

6. The method according to claim 5, wherein:
the first matrix is a product of a first weight and a matrix defined by the at least one visual feature vector; and
the second matrix is a product of a second weight and a matrix defined by the at least one word vector,
wherein the first weight is a weight determined based on a score of the at least one word feature vector; and
the second weight is a weight determined based on a score of the at least one visual feature vector.

7. The method according to claim 1, wherein said identifying the label of the first image from the at least one label based on the target feature comprises:
mapping the target feature to a probability distribution feature, wherein a number of dimensions of the probability distribution feature is equal to a number of dimensions of the at least one label, and a value at a position in the probability distribution feature represents a confidence of a label corresponding to the value at the position;
determining a first numerical value greater than a predetermined threshold in the probability distribution feature; and
determining a label corresponding to the first numerical value as the label of the first image.

8. The method according to claim 7, wherein the semantic relationship comprises at least one of a generic-specific semantic relationship, a similar semantic relationship, or an opposite semantic relationship.

9. The method according to claim 1, wherein a semantic relationship applies between the labels of the at least one label.

10. The method according to claim 1, wherein the label of the first image comprises the at least one label.

11. The method according to claim 1, wherein said obtaining the target feature of the first image comprises:
obtaining the target feature using a prediction model with the visual feature of the first image as an input.

12. An electronic device, comprising:
a memory having a computer program stored thereon; and
a processor configured to call and execute the computer program stored in the memory to:
obtain a target feature of a first image, wherein the target feature characterizes a visual feature of the first image and a word feature of at least one label; and
identify a label of the first image from the at least one label based on the target feature; wherein:
at least one visual feature vector corresponding to at least one image channel of the first image is used to generate the visual feature of the first image; and
at least one word feature vector corresponding to the at least one label is used to generate the word feature of the at least one label.

13. A computer-readable storage medium, having a computer program stored thereon, wherein the computer program causes a computer to:
obtain a target feature of a first image, wherein the target feature characterizes a visual feature of the first image and a word feature of at least one label; and
identify a label of the first image from the at least one label based on the target feature; wherein:
at least one visual feature vector corresponding to at least one image channel of the first image is used to generate the visual feature of the first image; and
at least one word feature vector corresponding to the at least one label is used to generate the word feature of the at least one label.

14. The electronic device according to claim 13, wherein:
the at least one word feature vector is used to direct the at least one visual feature vector to generate the visual feature of the first image; and the at least one visual feature vector is used to direct the at least one word feature vector to generate the word feature of the at least one label.

15. The electronic device according to claim 13, wherein a number of image channels in the at least one image channel is equal to a number of labels in the at least one label.

16. The electronic device according to claim 13, wherein a number of dimensions of each of the at least one visual feature vector is equal to a number of dimensions of each of the at least one word feature vector.

17. The electronic device according to claim 13, wherein said obtaining the target feature of the first image comprises:
   determining a first matrix based on the at least one visual feature vector;
   determining a second matrix based on the at least one word feature vector; and
   determining the target feature based on the first matrix and the second matrix.

18. The electronic device according to claim 17, wherein:
   the first matrix is a product of a first weight and a matrix defined by the at least one visual feature vector; and
   the second matrix is a product of a second weight and a matrix defined by the at least one word vector,
   wherein the first weight is a weight determined based on a score of the at least one word feature vector, and
   the second weight is a weight determined based on a score of the at least one visual feature vector.

* * * * *